Figure 1:
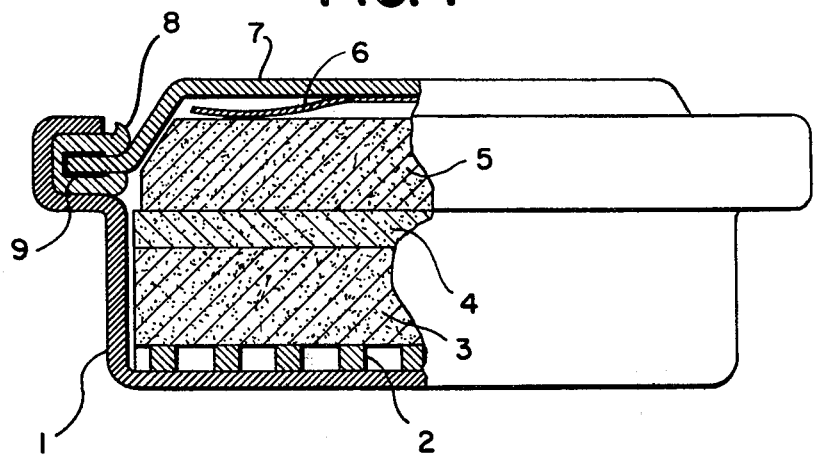

United States Patent [19]

Winsel

[11] 4,128,705
[45] Dec. 5, 1978

[54] GALVANIC ELEMENT, PARTICULARLY ALKALINE STORAGE BATTERY

[75] Inventor: August Winsel, Kelkheim, Fed. Rep. of Germany

[73] Assignee: Varta Batterie Aktiengesellschaft, Fed. Rep. of Germany

[21] Appl. No.: 820,160

[22] Filed: Jul. 29, 1977

[30] Foreign Application Priority Data

Aug. 12, 1976 [DE] Fed. Rep. of Germany ....... 2636230

[51] Int. Cl.² .............................................. H01M 2/02
[52] U.S. Cl. .................................... 429/171; 429/180; 429/185
[58] Field of Search ............... 429/163, 171, 172, 173, 429/175, 176, 180, 181, 184, 185

[56] References Cited

U.S. PATENT DOCUMENTS

| 3,416,964 | 12/1968 | Michalko | 429/181 X |
| 3,421,945 | 1/1969 | Michalko | 429/181 X |
| 3,799,959 | 3/1974 | Epstein et al. | 429/172 X |
| 3,840,408 | 10/1974 | Bondley | 429/181 |

Primary Examiner—Charles F. Lefevour
Attorney, Agent, or Firm—Weiser, Stapler & Spivak

[57] ABSTRACT

In a galvanic element which has a tendency to leak electrolyte at the lid seal, there is formed, on the metal enclosure portion which bears against the seal, a passive oxide surface layer which is not reducible at the negative electrode potential.

8 Claims, 2 Drawing Figures

U.S. Patent

Dec. 5, 1978

4,128,705

GALVANIC ELEMENT, PARTICULARLY ALKALINE STORAGE BATTERY

The invention relates to a galvanic element, and particularly an alkaline storage battery, whose active elements are contained within a housing which is closed in liquid-tight manner by means of a lid with an interposed seal.

Galvanic elements consist primarily of the positive and negative electrodes which are enclosed within the housing with interposition of a separator. The housing contains the electrolyte and is closed by means of a lid with interposition of a seal, in liquid-tight manner and if appropriate also in gas-tight manner.

The electrodes are plate-shaped or, in the case of button cells, tablet-shaped. Alternatively, they are wound in the form of a roll and inserted into a cylindrical cup forming the housing. Because the electrolyte of the cell generally exhibits a strong tendency to creep, and because varying pressures arise during usage of the cells, particularly in the case of storage batteries, the region in which the seal is provided is subject to heavy strains. It is, therefore, not possible to prevent leaks with complete reliability. This sealing problem plays a particularly significant role in alkaline storage batteries enclosed in gas-tight manner, because they are subject during usage to both overpressure and underpressure within the housing, and because the alkaline electrolyte of such storage batteries, e.g. of the nickel/cadmium type, exhibits strong tendency to creep.

To accomplish satisfactory sealing, a wide variety of seal constructions have been utilized, intended primarily to lengthen the creepage path. To effect closure, a wide variety of techniques have been used, designed to assure, for example, that the seal is subjected to radial pressure. It is, furthermore, also known that particularly pronounced leakage can take place in a nickel/cadmium storage battery when the housing is connected to the negative electrode. It has therefore been previously attempted to connect the housing to the positive electrodes and to carry the connections to the negative electrodes through a synthetic plastic lid.

However, all these precautions have heretofore not achieved complete reliability of the seal. As a result, particularly in the case of alkaline nickel/cadmium storage batteries in button cell configuration, leaks continue to occur.

Accordingly, it is an object of the invention to provide a reliable seal in galvanic elements, and particularly in alkaline storage batteries.

It is another object to provide such a seal which can be used in mass production.

It is another object of the invention to provide such a seal which does not give rise to increased assembly costs and does not appreciable complicate the manufacturing process.

These and other objects which will appear are achieved in accordance with the invention by covering the metal surface of the portion of the housing connected to the negative electrode, at least in the area in which it bears against the seal, with a passive oxide layer which is not reducible at the potential of the negative electrode.

Particularly suitable for the production of the oxide layer in accordance with the invention is heat treatment in the presence of ambient oxygen.

Figure 1A:
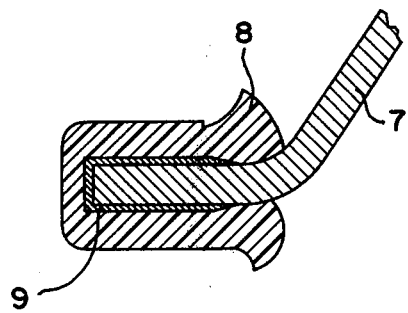

For further details about the invention, reference is made to the discussion which follows in light of the accompanying drawings wherein FIG. 1 is an elevation partly in cross-section of a button cell embodying the invention, and FIG. 1a is an enlarged view of a portion of the apparatus illustrated in FIG. 1.

The same reference numerals denote corresponding elements in the two Figures.

Within cell housing 1, there are located, with interposition of a bottom insert 2, the positive electrode 3, which may be a nickel hydroxide electrode, on top of it a porous separator 4, and finally a negative electrode 5, which may be particularly a cadmium electrode. The housing 1 is closed by means of lid 7. Between lid 7 and the negative electrode 5, a contact spring 6 is positioned.

In accordance with the invention, the lid is provided with an oxide cover layer 9, at least in the region in which the seal 8 bears against it. In FIG. 1a, this oxide cover layer is particularly emphasized and can be seen by way of illustration to extend only over the edge of the lid.

The oxide layer, according to the invention, may be formed directly of the metal which constitutes the interior surface of the housing. However, it can also be formed of a metal which is applied in firmly adhering fashion to the housing metal, for example through plating or cold welding. Thus, cover layers embodying the invention can be provided through heat treatment of thin titanium or nickel chrome steel applications. Titanium particularly is known to form an oxide which is non-conducting, difficult to dissolve and therefore extraordinarily resistant.

If appropriate, the oxides of chromium and tantalum are also suitable, as well as any metal oxides which are not attacked by the alkaline medium and which are not reduced under the operating conditions of the cell.

The formation of pore-free cover layers is further facilitated if the lattice characteristics of the metal and the metal oxide are not too different, and if oriented growth of the oxide layer (epitaxial growth) can take place. What is important is that the region of the housing portion against which the seal bears is provided with the oxide layer in a closed (annular) path.

In a preferred mode of realization of the invention, in which the housing portion consists entirely of nickel or as is customary of nickel-plated steel, a nickel oxide protective layer can be produced by tempering in air or in pure oxygen at temperatures between about 160° C. and 400° C., and preferably at about 320° C. to 370° C. It is also possible to produce the protective layer by first causing anodic oxidation through which an $Ni(OH)_2$ layer is formed on the nickel surface. After drying of the housing portion, which may for example be the lid, this layer is then decomposed, to NiO, for example by 1 hour long tempering at about 300° C. Under storage battery conditions $Ni(OH)_2$ cannot reform from such a layer.

To achieve uniform oxidation of the nickel surface, the tempering should last at least one-half hour. However, the tempering period may also be appreciably increased. A thin $Ni(OH)_2$ layer formed in chemical or electrochemical manner should, for example, be only about 5 to 30 molecular layers thick. Such a layer can then be decomposed to NiO through tempering, at a temperature which should be at least about 160° C.

Surprisingly, it has been found that by the technique embodying the invention, there is achieved a substantial improvement in the seal. This is consistent with the observation that the wettability of a metal is a function of potential, and that particularly the surface of a base metal is completely wettable in contact with water following its complete reduction. This is what gives the electrolyte the opportunity to creep. Consequently, the danger of leakage is particularly pronounced in the vicinity of the hydrogen potential. In the tendency to wetting, there is brought into play a correspondingly great working of the surface. It is true that conventional housing portions which have been nickel-plated have an oxidized surface when incorporated into the cell. However, in that case, the oxides have not been tempered. Therefore, particularly at elevated temperatures and at the potential of the negative electrode, they are reduced and thereby give rise to increased wettability.

I claim:

1. In a nickel/cadmium electrode battery with alkaline electrolyte, which battery has a housing having two portions and a seal interposed between said portions to close the housing in liquid-tight manner, one portion of the housing having a metal surface bearing against the seal and also connected to the cadmium electrode, the improvement wherein a passive oxide layer covers the said metal surface bearing against the seal, the oxide layer being non-reducible at the potential of the negative electrode, and being selected from the group of NiO and TiO$_2$.

2. The element of claim 1 wherein the passive oxide has been formed through tempering in the presence of oxygen.

3. The element of claim 1 wherein the passive oxide has a thickness of between about 5 and 30 molecular layers.

4. The element of claim 1 wherein the passive oxide forms an uninterrupted band along the periphery of the seal.

5. The element of claim 1 wherein the passive oxide layer is formed by oxidation of the surface of the material from which the housing is made.

6. The element of claim 1 wherein the surface layer is formed of a thin application of the oxide material to the surface of the housing portion.

7. The element of claim 1 wherein the passive oxide has been formed by chemical or electrochemical oxidation and subsequent tempering.

8. In a storage battery with positive and negative electrodes and alkaline electrolyte, which battery has a housing having two portions and a seal interposed between said portions to close the housing in liquid-tight manner, one portion of the housing having a metal surface bearing against the seal and also connected to the negative electrode, the improvement wherein a passive oxide layer covers the said metal surface bearing against the seal, the oxide layer being non-reducible at the potential of the negative electrode, and being selected from the group of NiO, TiO$_2$ and oxides of chromium and tantalum.

* * * * *